United States Patent
Egan

[15] 3,648,440
[45] Mar. 14, 1972

[54] WET SCRUBBER SYSTEM
[72] Inventor: Richard T. Egan, Williamsport, Md.
[73] Assignee: The Carborundum Company, Niagara Falls, N.Y.
[22] Filed: Sept. 2, 1969
[21] Appl. No.: 854,451

[52] U.S. Cl. .................................. 55/226, 55/227, 55/240, 55/257, 261/36 R, 261/62, 261/109
[51] Int. Cl. ........................................................ B01d 47/00
[58] Field of Search .................. 55/223, 226, 227, 229, 248, 55/257; 261/DIG. 54, 36, 62, 109, 108, 110, 111, 116

[56] References Cited

UNITED STATES PATENTS

| | | |
|---|---|---|
| 3,517,485 | 6/1970 | Dell'Agnese et al. ..................... 55/226 |
| 770,910 | 9/1904 | Keyling ................................. 261/111 |
| 3,167,413 | 1/1965 | Kiekins et al. ..................... 261/DIG. 54 |
| 488,580 | 12/1892 | Shepard ........................... 261/111 X |
| 1,009,963 | 11/1911 | Gamblin .............................. 261/111 |

Primary Examiner—Tim R. Miles
Assistant Examiner—Steven H. Markowitz
Attorney—Karl W. Brownell

[57] ABSTRACT

A wet scrubber system includes a receptacle having a gas inlet at its top and a liquid sump at its bottom. The gas is intimately mixed with a scrubbing liquid in a contact section which has a frustoconical scrubbing section therebelow. A vertically movable target plate is in the scrubbing section for vertical adjustment in accordance with the pressure of the system.

11 Claims, 1 Drawing Figure

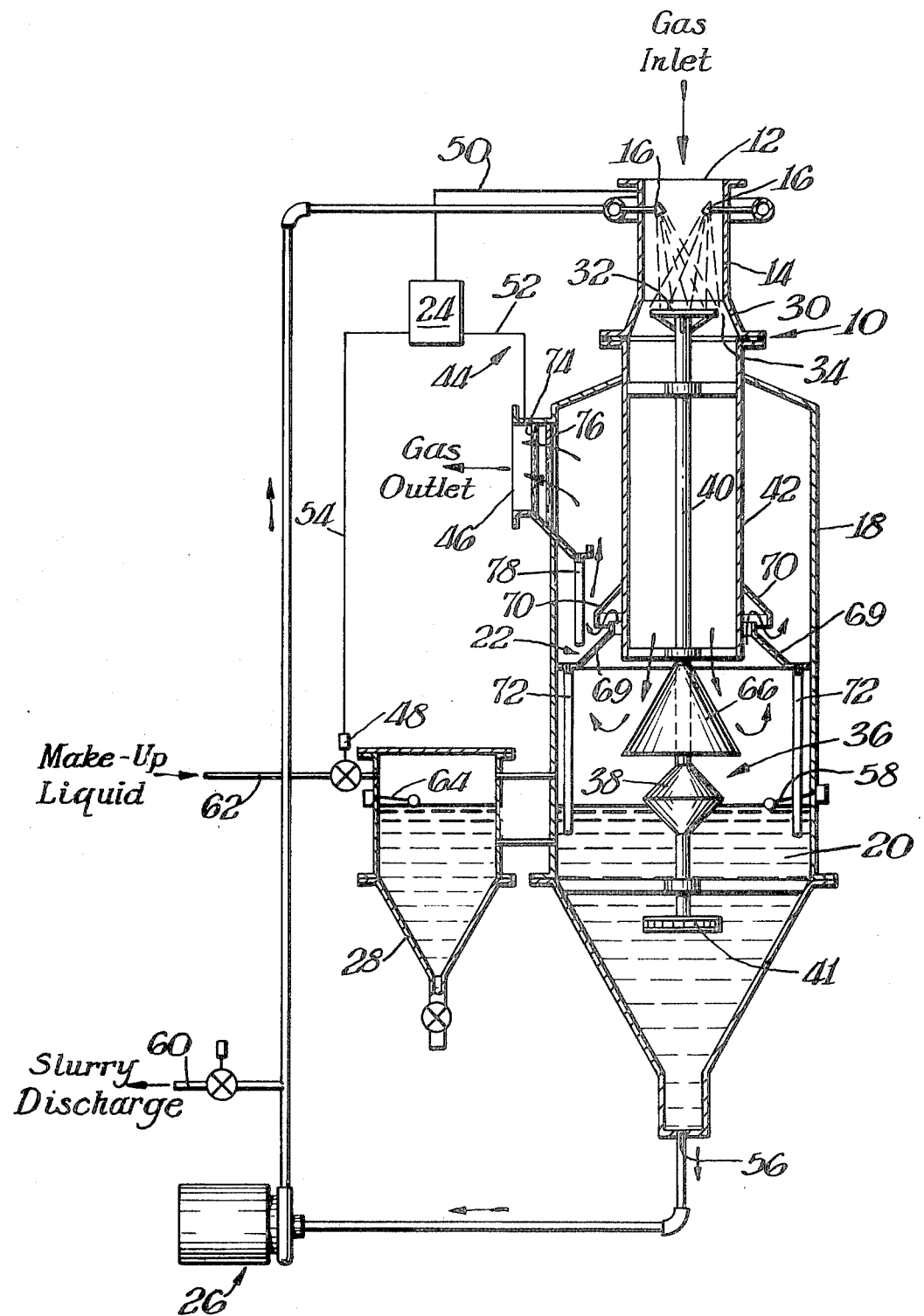

WET SCRUBBER SYSTEM

BACKGROUND OF INVENTION

Various wet scrubber systems are utilized in substantially all industries to collect particulate and gaseous material from the process gases. Such systems frequently work on the venturi principle although other systems are in existence. With such systems there is frequently a variance in pressure drop when the gas flow varies. If this pressure drop is not controlled the efficiency of the system will be impaired.

SUMMARY OF INVENTION

An object of this invention is to provide a wet scrubber system which has a high degree of efficiency of operation is over a wide range of gas volumes.

A further object of this invention is to provide such a system which maintains either constant pressure drop with varying gas flow or varies the pressure drop in accordance with the process and power requirements.

In accordance with this invention the wet scrubber system includes a receptacle having a gas inlet at its top and a liquid sump at its bottom. The gas is intimately mixed with a scrubbing liquid in a contact section which has a frusto-conical scrubbing section therebelow. A vertically movable target plate is in the scrubbing section for vertical adjustment in accordance with the pressure drop requirements of the system.

The target plate may be automatically adjusted by being mounted on a vertical centering shaft connected to a float which floats upon a liquid sump. Thus as the liquid level increases the target plate is elevated to a smaller cross-sectional level of the frusto-conical scrubbing section. Conversely, a lowering of sump level moves the target plate downward in the scrubbing section.

A deflector cone may be disposed above the sump to direct the gas toward its outlet. A primary mist eliminator in the form of baffles may be arranged between the deflector cone and the outlet with a secondary mist eliminator disposed in the outlet.

The arrangement may also include a liquid make-up chamber for controlling the level of liquid in the sump to cause the up or down movement of the target plate.

THE DRAWING

The single FIGURE schematically exemplifies the wet scrubber system of this invention.

DETAILED DESCRIPTION

The wet scrubber system 10 of this invention is particularly effective for the wet scrubbing of particulate and gaseous contaminants. As indicated in the drawing system 10 includes a gas inlet 12 and a cylindrical contact section 14 where the incoming gases are intimately mixed with the scrubbing liquid supplied from nozzles 16. At the bottom of the housing or receptacle 18 is an integral sump chamber 20 with a primary mist elimination section 22 and an automatic proportional control system 24 to maintain either a constant pressure drop with varying gas flow or conversely to vary the system drop in accordance with the process and power requirements. Additionally, a scrubbing liquid recirculation system 26 is provided along with the liquid level control-make-up chamber 28.

In operation of system 10 the gas stream is first intimately mixed with the scrubbing liquid in contact section 14 and then flows in a downward direction to the frusto-conical shaped scrubbing section 30. In this scrubbing section 30 is disposed target plate 32. The gas stream and air-borne liquid droplets are accelerated to a high velocity in the scrubbing section 30 with the scrubbing liquid being sheared off the face of the target plate 32 into the annulus 34 formed between the frusto-conical casing of section 30 and the perimeter of target plate 32 thus forming an extremely fine atomization while promoting the intimate contact between the particulate material and the scrubbing liquid as is essential in the scrubbing process.

Since the efficiency of the contacting process and overall scrubbing is related to the energy consumed in the form of pressure drop across the scrubbing section, it is of the utmost importance to maintain this pressure drop constant at a rate consistent with system requirements. In accordance with this invention an automatic feature is provided to ensure optimum scrubbing conditions during varying process flows. The vertical displacement of target plate 32 within the frusto-conical scrubbing throat 30 creates an annulus 34 of variable size through which the gas is directed. By varying the position of target plate 32 vertically in this tapered section 30 the annulus area is thus correspondingly increased or decreased. This change in area of annulus 34 will, with constant gas flow, vary the pressure drop across scrubbing section 30. With a gas flow of varying volume an adjustment of the throat restriction will maintain a constant pressure drop.

The vertical movement of target plate 32 is accomplished by a prime mover 36 which includes a calibrated float mechanism 38 connected to vertical centering shaft 40 in guide conduit 42 with target plate 32 being affixed to the top of centering shaft 40 and with dampening device 41 affixed to the bottom of shaft 40. As is apparent from the drawing the top of tapered section 30 is of the same cross section as the uniform cross section of contact section 14, while the bottom of section 30 is of the same cross section as the uniform cross section of guide conduit 42.

To alter the vertical displacement of target plate 32 in scrubbing section 30 a change in the liquid level in sump 20 is effected. The change in liquid level is accomplished through the aid of a continuous sensing system 44 connected across the scrubber inlet 12 and outlet 46 which measures the pressure differential due to gas flow and target plate position. A change in process conditions will be detected by this automatic device 44 causing a signal from the differential pressure transmitter to the proportional controller (both of which are illustrated schematically as element 24) which in turn provides a compensating signal to the modulating valve 48. The various static lines of this automatic device 44 are indicated at 50, 52, 54. The change in liquid level in the sump 20 due to discharge from the system through drainage outlet 56 is continuously sensed by sensor 58 in the same manner to thus cause introduction of make-up liquid from chamber 28 at the same rate as the slurry discharge through line 60. The make-up liquid is introduced through line 62 into chamber 28 and thence to sump 20. Make-up chamber 28 includes the necessary indicators and controls 64 for high level alarm as well as secondary level control and conditioning additive mixing when required.

The gas flow exits from the lower portion of guidance conduit 42 and impinges upon conical deflector 66 and the surface of sump liquid and then turns vertically upward through the tortuous path formed by annular primary mist eliminator baffle 69 secured to the wall of receptacle 18 and annular baffle 70 secured to guide 42. Collected moisture drains into sump 20 through drain tubes 72. From the primary mist eliminator baffles 69, 70 the gas is directed outwardly through a hook type or other appropriate secondary mist eliminator baffles 74, 76 disposed at outlet 46 and also provided with drain tubes 78 to evacuate the collected moisture.

What is claimed is:

1. A wet scrubber system comprising a receptacle, a gas inlet at the top of said receptacle, a liquid sump in the bottom of said receptacle, a contact section in said receptacle below said inlet, means for feeding a scrubbing liquid into said contact section for intimately mixing the incoming gas with the scrubbing liquid, a frusto-conical scrubbing section below said contact section, a vertically movable target plate in said scrubbing section, an outlet in said receptacle for scrubbed gas, means floating on said liquid sump for selectively moving said target plate upwardly and downwardly in accordance with the liquid level in said sump.

2. A wet scrubber system as set forth in claim 1, including means for changing the level of liquid in said sump in accordance with changes in the pressure in said system.

3. A wet scrubber system as set forth in claim 2 wherein said means for changing the level of liquid includes a liquid make-up chamber adapted for liquid communication with said sump, and drainage means in said sump with pressure sensing means connected to said gas inlet and said gas outlet and to said make-up chamber for controlling the level of liquid in said sump.

4. A wet scrubber system as set forth in claim 2 wherein said floating means includes a vertical centering shaft extending into said sump and mounted at one end to said target plate, and a float connected to the other end of said shaft and floating on said sump to selectively move said shaft vertically upward and downward in accordance with the liquid level of said sump.

5. A wet scrubber system as set forth in claim 4 including a guidance conduit disposed around said centering shaft in communication with and of the same cross section as the bottom of said scrubbing section, and a deflector cone being disposed adjacent the bottom end of said guidance conduit above said float.

6. A wet scrubber system as set forth in claim 5 including primary mist eliminator means and secondary mist eliminator means between said deflector cone and said gas outlet.

7. A wet scrubber system as set forth in claim 6 wherein said primary mist eliminator means includes a first annular baffle secured to the wall of said receptacle and having drain tubes connected thereto, and a second annular baffle secured to said guidance conduit to form a tortuous path for the gas flowing therebetween.

8. A wet scrubber system as set forth in claim 7 wherein said secondary mist eliminator means include baffle plates in said gas outlet with drain tubes provided thereto.

9. A wet scrubber system as set forth in claim 8 including recirculating means between said gas inlet and said sump drainage means, and slurry discharge means connected to said recirculating means.

10. A wet scrubber system as set forth in claim 9 wherein said pressure sensing means includes a differential pressure transmitter and proportional controller connected by static lines to said gas inlet and said gas outlet and to a modulating valve connected to said make-up chamber.

11. A wet scrubber system as set forth in claim 10 including a dampening device disposed in said sump and connected to the lower end of said centering shaft.

* * * * *